(No Model.)

C. B. COTTRELL.
REVERSING GEAR FOR MACHINERY.

No. 368,518. Patented Aug. 16, 1887.

Witnesses
C. Sundgren
Emil Herter

Inventor:
Calvert B. Cottrell
by his Atty
Brown & Hall

UNITED STATES PATENT OFFICE.

CALVERT B. COTTRELL, OF STONINGTON, CONNECTICUT.

REVERSING-GEAR FOR MACHINERY.

SPECIFICATION forming part of Letters Patent No. 368,518, dated August 16, 1887.

Application filed December 8, 1886. Serial No. 220,965. (No model.)

*To all whom it may concern:*

Be it known that I, CALVERT B. COTTRELL, of Stonington, in the county of New London and State of Connecticut, have invented a new and useful Improvement in Reversing-Gear for Machinery, of which the following is a specification.

My invention relates to mechanism which comprises fast and loose pulleys upon a driving-shaft for receiving a shifting belt; and the object of the invention is to provide, in a simple way, for transmitting to the driving-shaft, at any desired time when the driving-belt is upon the loose pulley, rotary motion in a reverse direction to that which the driving-shaft receives when the belt is upon the fast pulley, and usually such reverse motion is at a much slower speed than the direct or normal rotation of the shaft.

My improved mechanism may be employed in various kinds of machinery—as, for example, in a printing-press, where it is sometimes desired, after shifting the belt upon the loose pulley to stop the press, to impart a reverse motion to the driving-shaft for backing up the press.

In carrying out my invention I arrange upon the driving-shaft fast and loose pulleys, and I employ a counter-shaft, which is geared with the driving-shaft and which is also provided with a pulley. A fourth pulley is secured to the loose pulley so as to rotate therewith, and so that it will range in position with the pulley on the counter-shaft, in order that the two may receive a slack belt. I also employ a belt-tightener, whereby, whenever desired, and at a time when the driving-belt is upon the loose pulley, the aforesaid slack belt may be tightened, so that it will impart from the loose pulley and through the counter-shaft geared with the driving-shaft, a reverse rotary motion to the driving-shaft.

The invention consists in novel combinations of parts above referred to, and hereinafter particularly described, and pointed out in the claims.

Figure 1:
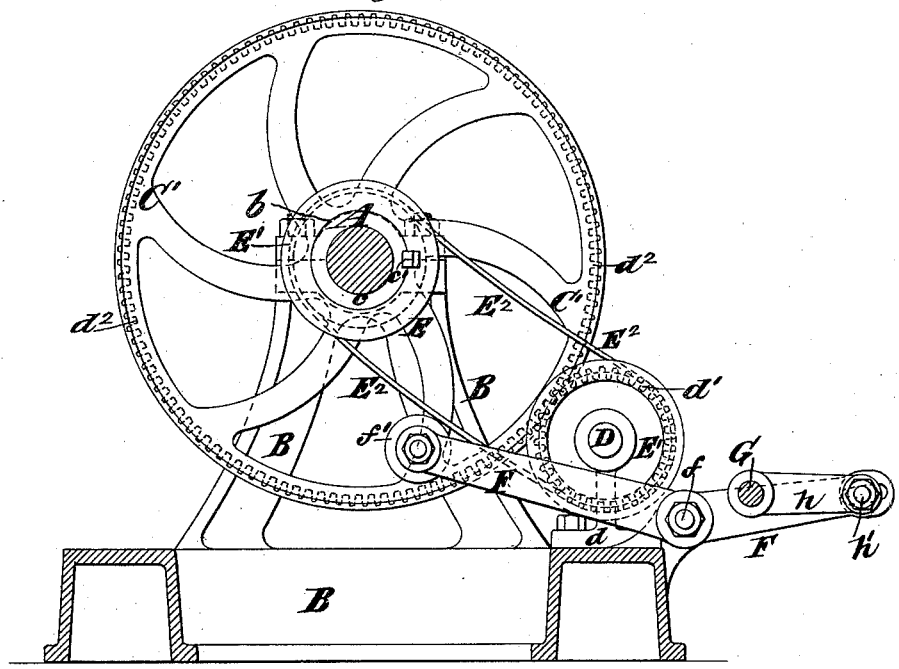
Figure 2:
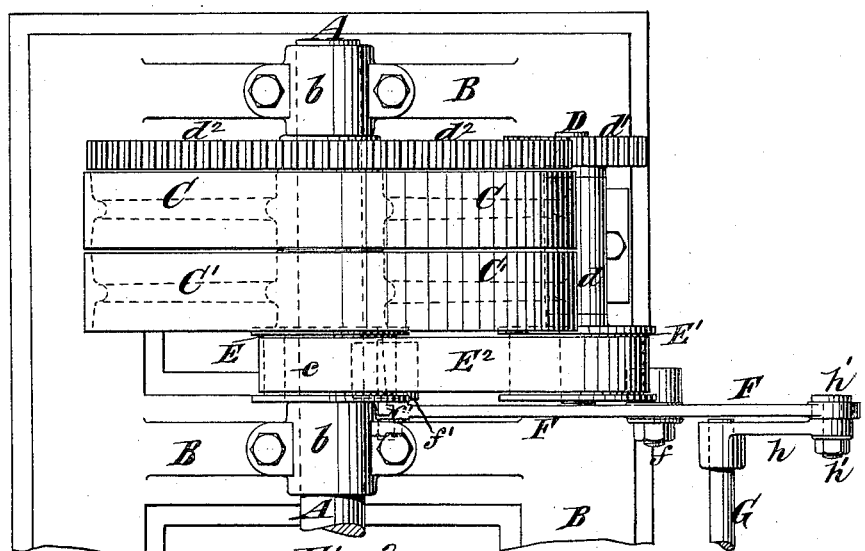
Figure 3:
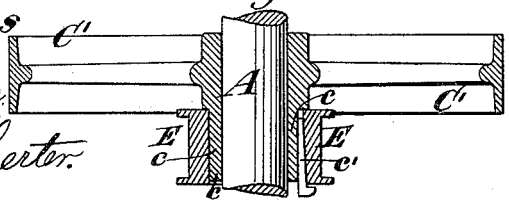

In the accompanying drawings, Figure 1 is a transverse section of a driving-shaft and supporting-frame and an elevation of reversing-gear embodying my invention. Fig. 2 is a plan of the parts shown in Fig. 1; and Fig. 3 represents a portion of the driving-shaft and the loose pulley, together with the pulley which is secured thereto so as to rotate therewith.

Similar letters of reference designate corresponding parts in the several figures.

A designates a portion of the driving-shaft, which is journaled in suitable bearings, $b$, upon the frame B, and to which are fitted fast and loose pulleys C C'. The fast pulley C is secured to the shaft A by a set-screw, key, or any other ordinary and well-known means, and the loose pulley C' is free to turn upon the shaft A without imparting motion thereto.

D designates a counter-shaft, which is arranged parallel with the driving-shaft A, and supported in a suitable bearing, $d$, and the shaft D is, by means of the pinion $d'$ and the wheel $d^2$, or by other suitable gearing, connected or geared directly with the driving-shaft A. The counter-shaft D therefore is rotated idly whenever the driving-belt (not shown) is upon the fast pulley C, which imparts motion directly to the shaft A.

E E' designate the two pulleys which range with each other in the same vertical plane, and around which passes a normally slack belt, $E^2$. The pulley E' is secured fast to the counter-shaft D, and the pulley E is secured to the loose pulley C' in any suitable manner, so as to rotate therewith. As best shown in Fig. 3, I may form upon the loose pulley C' a long hub, $c$, to which the pulley E is directly fitted, and on which the pulley E may be secured by a key, $c'$, or other suitable device, so that the pulleys C' E will rotate synchronously.

When the driving-belt is upon the fast pulley C the counter-shaft D will, as before stated, be driven, but, owing to the slackness of the belt $E^2$, the pulley E' will turn idly within it without imparting motion to the belt and the loose pulley C'. It will be obvious, however, that by tightening the belt $E^2$ at any time when the driving-belt is upon the loose pulley C' motion will be transmitted from said loose pulley through the pulleys E E' and belt $E^2$ to the counter-shaft D, and through the pinion and wheel $d'$ $d^2$ the driving-shaft A will be rotated in a direction the reverse of that which it receives when operated directly by the driving-belt upon the fast pulley C; but owing to the different sizes of the pinion and wheel $d'$ $d^2$, this reverse motion of the shaft A will be much slower than its direct rotation.

The belt-tightener which I have represented consists of a lever, F, fulcrumed at $f$, and carrying at one end a belt-tightening wheel or pulley, $f'$, which, by the movement of the lever F, may be brought to bear against the belt $E^2$.

G designates a rock-shaft provided with an arm, $h$, which is connected at $h'$ to one arm of the lever F, and it will therefore be apparent that by turning the rock-shaft G the arm $h$ will be caused to impart a swinging movement to the lever F, and will therefore tighten the belt $E^2$.

From the above description it will be seen that I accomplish the desired result, which is the rotation of the shaft A in a reverse direction to that which it normally receives, by a very simple combination of mechanism.

What I claim as my invention, and desire to secure by Letters Patent, is—

1. The combination, with a driving-shaft and fast and loose pulleys thereon, of a counter-shaft geared with the driving-shaft and provided with a pulley, a pulley secured to the loose pulley so as to rotate therewith and ranging with the pulley on the counter-shaft, so that the two may receive a slack belt, and a belt-tightener, whereby a reverse motion may be imparted to the driving-shaft when the driving-belt is on the loose pulley, substantially as herein described.

2. The combination, with the counter and driving shafts A D, geared together, and fast and loose pulleys C C' on the driving-shaft, of the pulleys E E', one secured to the loose pulley C', to rotate therewith, and the other on the counter-shaft, the belt $E^2$, a lever, F, carrying a belt-tightening pulley, and a rock-shaft and arm, G $h$, whereby the lever may be operated, substantially as herein described.

CALVERT B. COTTRELL.

Witnesses:
C. HALL,
FREDK. HAYNES.